United States Patent
Grant et al.

(10) Patent No.: US 10,378,267 B2
(45) Date of Patent: Aug. 13, 2019

(54) SAFE PROTECTION APPARATUSES AND METHODS

(71) Applicants: Andrew Grant, Duluth, GA (US); Ian McFarlane Denny, Perth (GB); Donald Iain MacInnes, Angus (GB)

(72) Inventors: Andrew Grant, Duluth, GA (US); Ian McFarlane Denny, Perth (GB); Donald Iain MacInnes, Angus (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/608,897

(22) Filed: May 30, 2017

(65) Prior Publication Data

US 2018/0347255 A1    Dec. 6, 2018

(51) Int. Cl.
*E05G 1/024* (2006.01)
*B32B 5/02* (2006.01)

(52) U.S. Cl.
CPC ............. *E05G 1/024* (2013.01); *B32B 5/024* (2013.01); *E05Y 2800/40* (2013.01); *E05Y 2800/676* (2013.01); *E05Y 2800/68* (2013.01)

(58) Field of Classification Search
CPC ............ E05G 1/00; E05G 1/005; E05G 1/024
See application file for complete search history.

(56) References Cited

U.S. PATENT DOCUMENTS

| | | | |
|---|---|---|---|
| 1,567,707 A | 12/1925 | Carlson | |
| 4,263,365 A * | 4/1981 | Burgess | B32B 13/04 428/312.4 |
| 4,574,454 A * | 3/1986 | Dyson | E05G 1/024 109/65 |
| 4,662,288 A * | 5/1987 | Hastings | B32B 19/04 109/10 |
| 5,069,358 A * | 12/1991 | Avery, Jr. | E05G 1/024 109/84 |
| 5,152,231 A * | 10/1992 | Preston | E05G 1/024 109/65 |
| 6,841,209 B2 * | 1/2005 | Legare | B32B 9/00 252/601 |
| 8,327,778 B2 * | 12/2012 | DelloRusso, Jr. | E05G 1/024 109/26 |
| 8,474,386 B2 * | 7/2013 | DelloRusso, Jr. | E05G 1/024 109/26 |
| 8,555,794 B2 * | 10/2013 | Tamura | G07D 11/00 109/49.5 |
| 8,567,665 B2 * | 10/2013 | Boyes | E05G 1/024 235/379 |
| 9,333,714 B2 * | 5/2016 | Tunis, III | B43L 1/008 |

(Continued)

FOREIGN PATENT DOCUMENTS

| EP | 0633381 A1 | 1/1995 |
|---|---|---|
| WO | 2014/076223 A1 | 5/2014 |
| WO | 2015/200932 A2 | 12/2015 |

OTHER PUBLICATIONS

European Search Report—dated Oct. 17, 2018.

*Primary Examiner* — Christopher J Boswell
(74) *Attorney, Agent, or Firm* — Schwegman, Lundberg & Woessner

(57) ABSTRACT

A safe includes at least one wall having a gap with a safe protection mechanism inserted into the gap. The at least one wall when penetrated by an attack tool attempting to penetrate an interior of the safe activates the safe protection mechanism to thwart and/or impeded progress of the attack tool.

18 Claims, 5 Drawing Sheets

(56) References Cited

U.S. PATENT DOCUMENTS 9,582,972 B2 * 2/2017 Tavares De Pinho ...................... E05G 1/024
2015/0275568 A1 * 10/2015 Eng ..................... E05G 1/024
428/35.2

* cited by examiner

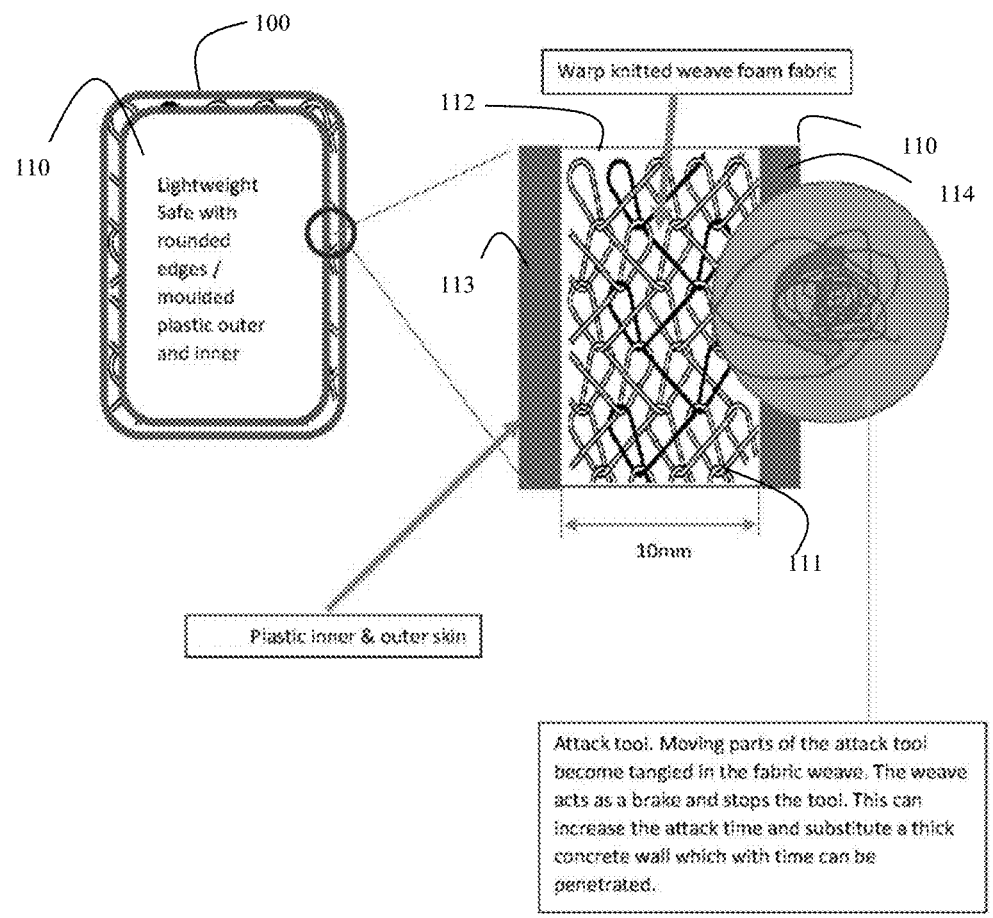
FIG. 1A
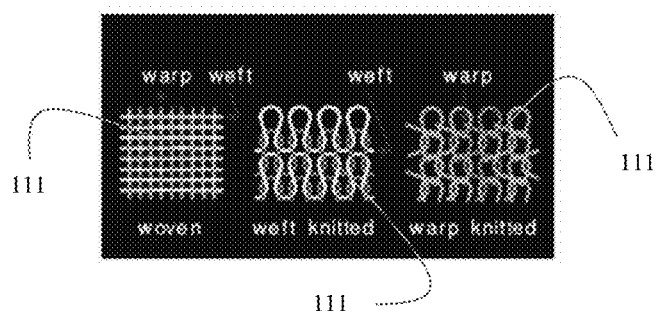

SAFE PROTECTION APPARATUSES AND METHODS

BACKGROUND

Existing high security safes use steel reinforcement to add strength to the safes and increase the needed safe attack times. Steel adds substantial manufacturing costs and increases the weight of the safes making transport and installation of the safes more difficult.

SUMMARY

In various embodiments, methods and apparatuses for enhanced safe protection are presented.

According to an embodiment, a safe apparatus is presented. Specifically, and in an embodiment, the safe apparatus includes walls and at least one wall includes a gap, inserted into the gap is a safe protection mechanism that thwarts and/or impedes a safe attack on the safe.

BRIEF DESCRIPTION OF THE DRAWINGS

FIG. 1A is a diagram of a safe apparatus, according to an example embodiment.

DETAILED DESCRIPTION

Figure 1B:
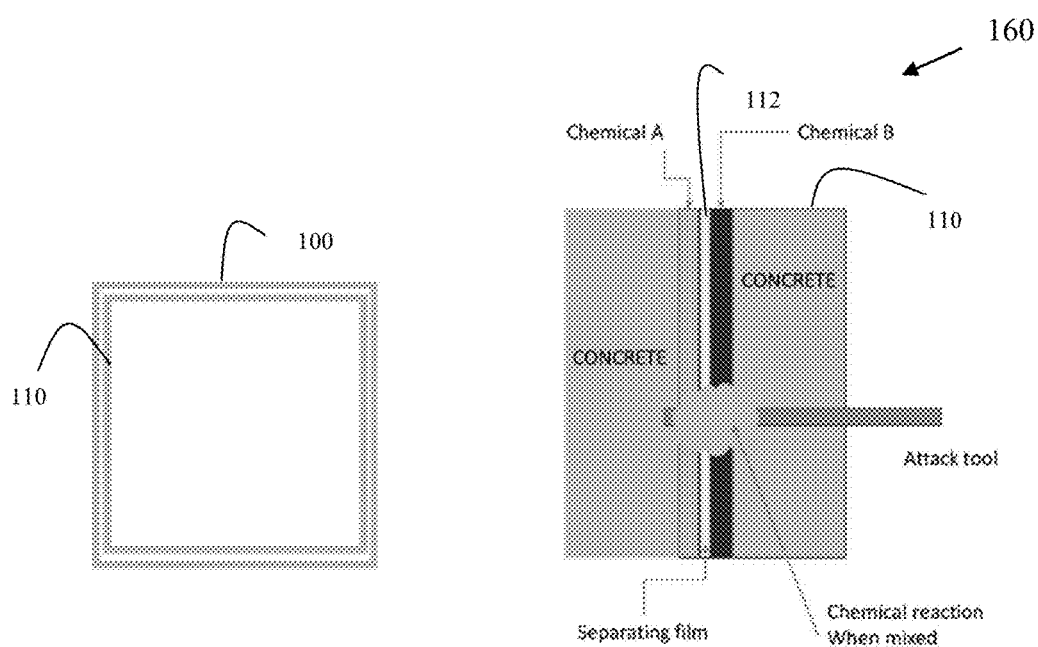
FIG. 1B is a diagram of another safe apparatus, according to an example embodiment.

FIG. 1A is a diagram of a safe apparatus 100, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of safe protection, presented herein and below.

The safe apparatus 100 (hereinafter safe 100) includes a safe door 110 and the safe door includes: an externally facing solid surface 113 (the surface visible to an onlooker when the safe door 110 is closed), an internally facing solid surface 114 (the surface visible when the safe door 110 is opened and the surface on the interior of the safe door), a gap 112 between the externally facing surface 113 and the internally facing surface 114, and a weaved fabric material 111 inserted in the gap 112.

The weaved fabric material 112 is designed to bunch around a drill bit or drilling tool when the externally facing surface 113 is penetrated by the drilling tool so as to impeded progress of the drilling tool to reach the internally facing surface 114 or progress through the internally facing surface 114 to reach the interior of the safe 100. The circular graphic in the FIG. 1A illustrates how the attack tool becomes tangled in the fabric 111 with the fabric 111 bunching up around the attack tool.

The graphic at the bottom of the FIG. 1A illustrates a variety of types of weaves that can be deployed for the fabric 111, such as a wart and weft woven fabric 111, a weft knitted fabric 111, and a warp knitted fabric 111. It is noted that other types of woven fabric patterns can be used without departing from the novel aspects of the presented safe 100.

In an embodiment, the gap 112 between the externally facing surface 113 and the internally facing surface 114 is approximately 10 mm. Again, it is noted that other sizes of the gap 112 can be deployed without departing from novel aspects of the presented safe 100.

In an embodiment, the gap 112 and the inserted fabric 111 surrounds all six sides of the safe 100; rather than just the door 110, such that the externally facing surface 113 and the internally facing surface 114 with the gap 112 and the fabric 111 surround all size sides of the safe 100.

In an embodiment, the externally facing surface 113 and the internally facing surface 114 are constructed of a single solid material, such as hard plastic.

In an embodiment, a thin portion of the externally facing surface 113 is constructed of steel while a remaining portion of the externally facing surface 113 is a hard plastic.

In an embodiment, a thin portion of the internally facing surface 114 is constructed of steel while a remaining portion or the internally facing surface 114 is a hard plastic.

In an embodiment, both or just one of the externally facing surface 113 and the internally facing surface 114 are constructed of solid steel.

In an embodiment, the safe 100 and the safe door 110 is constructed of hard plastic with rounded edges.

Uses of plastic for the entire safe 100 or just some portions of the safe 100 as discussed above makes the safe 100 lighter than conventional safes 100, which means there is an improved ability to transport and install the safe in a Point-Of-Sale (POS) terminal or a Self-Service Terminal (SST), such as an Automated Teller Machine (ATM) or a kiosk.

Moreover, the gap 112 manufacture between the externally facing surface 113 and the internally facing surface 114 allows the safe 100 to be lighter than conventional all solid steel constructed safes, which also improves safe transport and installation.

In an embodiment, the fabric 111 is made of foam. In an embodiment, portions of the woven fabric 111 are constructed of a first material while other portions of the woven fabric 111 are constructed of a second and different material. In an embodiment, all or a portion of the fabric 111 is made of Kevlar®.

Again, the entire six sides of the safe can be constructed in the presented manner or just the safe door 110.

The presented safe 100 also reduces the conventional cost of manufacturing the safe 100 because conventional safes are constructed of solid steel walls with no gaps and steel is expensive relative to a low cost fabric 111 with a safe 100 that includes less steel or is devoid of steel entirely (as discussed above in the various presented embodiments).

Additionally, the presented embodiments of the safe 100 are substantially lighter and less expensive to manufacture than conventional safe construction while at the same time, the presented safe 100 increases safe protection and security by thwarting or substantially impeding penetration into the interior of the safe 100 through the fabric 111 protection mechanism.

FIG. 1B is a diagram of another safe apparatus 100, according to an example embodiment.

The embodiment presented in the FIG. 1B differs from the embodiment presented in the FIG. 1A in a few ways.

Notably, the gap 112 includes a separating film that segments the gap 112 into two separate compartments. Each compartment includes a different chemical mixture, such that when an attack tool penetrates the film the two separate chemical mixtures release and mix with one another. This creates a chemical reaction that produces a solid in short period of time to impeded or thwart the attach tool from reaching the internally facing surface 114 of the safe 100. The entire gap 112 includes both chemical A and B and the separating film.

In an embodiment, as illustrated in the FIG. 1B, the gap can also include two layers of concrete thick enough to impede (slow down) or damage the attack tool during cutting of the safe 100. The gap 112 then includes a first layer of concrete followed by chemical A followed by a thin separating film followed by chemical B and a second layer of concrete.

In an embodiment, the two separate chemicals or chemical mixtures A and B when mixed and interacted with one another produce a self-hardening by product (such as a hardening and quick setting foam). A plurality of chemical mixture can achieve this end, such as Alumilite Rigid Foams®, mixing Polyurethane foam liquids, etc.

In an embodiment, there is a single chemical mixture that is inserted in the gap 112 under pressure, such that when the pressure is eased through a penetration into the gap, the chemical mixture hardens into a hard foam, such as 3M Polystyrene Foam®, Tiger Foam®, etc. In this embodiment, there is no film in the gap and the chemical mixture is a mixture that rapidly hardens when pressure is eased and/or when exposed to air.

FIG. 1A illustrates a woven fabric in a gap 112 of safe 100 walls to impeded an attack tool from penetrating the interior of a safe 100. FIG. 1B illustrates one or more chemicals that when mixed or when pressure is eased or exposed to air produces a rapidly setting hardened foam that impedes an attack tool from penetrating the interior of a safe. The gap 112 can be included in the manufacture of just the safe door 110 or the entire six side walls of the safe 100.

The embodiments presented provides improved safes 100 that are lighter than conventional safes and less expensive to manufacture. The improved safes 100 also provide improved safe protection from attack tools attempting to penetrate into the interior of the safe 100.

These and other embodiments are now discussed with reference to the FIGS. 2-4.

Figure 2:
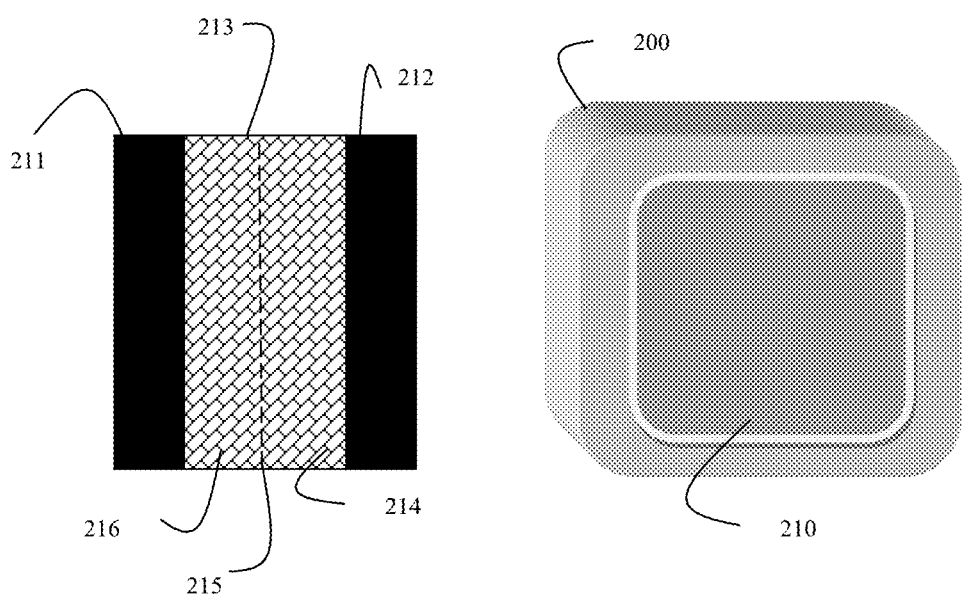
FIG. 2 is a diagram of a safe apparatus, according to an example embodiment.

FIG. 2 is a diagram of a safe apparatus 200. The safe apparatus 200 referred to herein as just "safe 200."

In an embodiment, the safe 200 is the safe 100 of the FIG. 1A.

In an embodiment, the safe 200 is the safe 100 of the FIG. 1B.

The safe 200 includes six walls or surfaces having an interior compartment for which valuables are maintained, such as currency and the like.

The safe 200 also includes a safe door 210.

At least one wall of the safe is manufactured with a solid externally facing surface 211 and a solid internally facing surface 212. The externally facing surface 211 separated from the internally facing surface 212 by a gap 213 and inserted into the gap 213 is a safe protection mechanism 214, 215, and/or 216.

In an embodiment, the gap 213 with the safe protection mechanism 214, 215, and/or 216 is approximately 10 millimeters in thickness. The gap 213 creates an interior chamber within the at least one wall. Inserted into the chamber is the safe protection mechanism 214, 215, and/or 216.

In an embodiment, the walls are constructed of a hard plastic material.

In an embodiment, the at least one wall is the wall of the safe door 210.

In an embodiment, the at least one wall is all six walls or surfaces of the safe 200.

In an embodiment, the safe protection mechanism is a woven fabric 214 as discussed above with the discussion and illustration of the FIG. 1A and the fabric 111.

In an embodiment, the safe protection mechanism includes a thin film 215 and a first chemical 214 and a second chemical 216. The film 215 when penetrated by an attack tool ruptures and causes the two chemicals 214 and 216 to mix with one another or interact with one another forming a hard and quick setting foam around a site that the film 215 was penetrated or ruptured.

In an embodiment, the safe protection mechanism includes a single chemical 214 or 215 that is under pressure, such that when the externally facing surface 211 of the at least one wall is penetrated by an attack tool, pressure is eased and air mixes with the chemical 214 or 215, which induces a quick setting hard foam byproduct around a site where the externally facing surface 211 was penetrated in order to thwart or impeded the progress of an attack tool.

In an embodiment, the externally facing surface 211 is constructed of a first solid material and the internally facing surface 212 is construed of a second solid material that is different from the first solid material.

In an embodiment, the externally facing surface 211 and the internally facing surface 212 are constructed of a same solid material.

In an embodiment, the gap 215 includes a first portion abutting the externally facing surface 211 filled with concrete and the gap 215 includes a second portion abutting the internally facing surface 212 filled with concrete. The gap 215 also includes the safe protection mechanism 215, 215, and/or 216 between the first and second portions.

Figure 3:
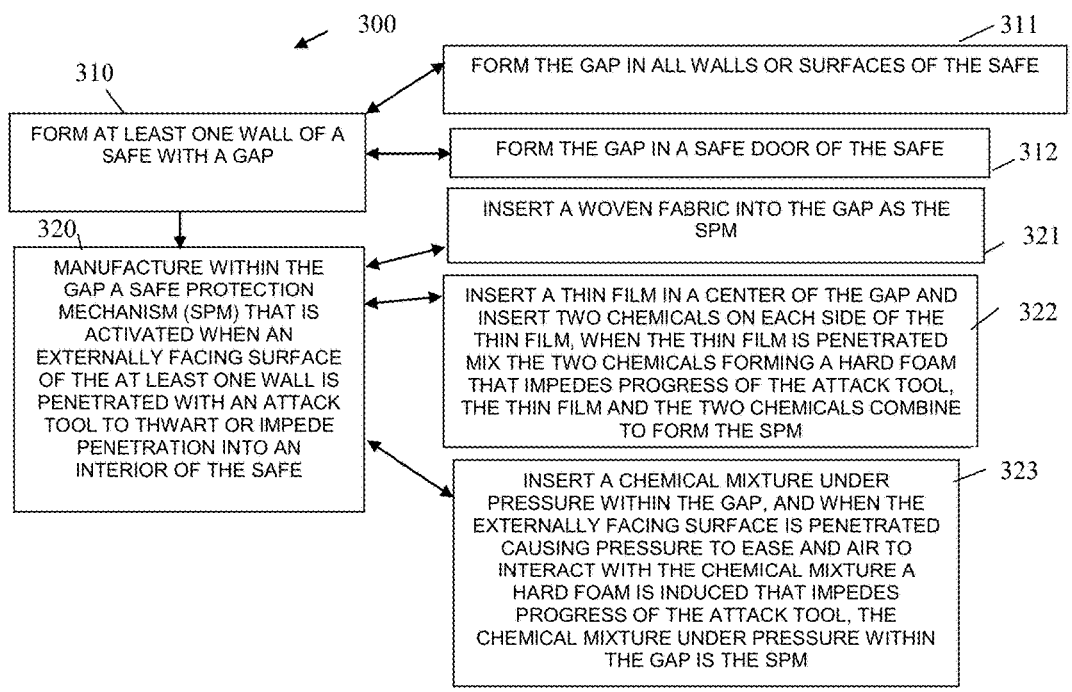
FIG. 3 is a diagram of a method for protecting a safe, according to an example embodiment.

FIG. 3 is a diagram of a method 300 for safe protection, according to an example embodiment.

The method 300 representing a method of manufacturing the safe 100 of the FIGS. 1A and 1B and the safe 200 of the FIG. 2.

At 310, at least one wall of the six walls or surfaces of the safe is formed with a gap, such that the at least one wall includes an interior chamber that separates an externally facing surface of the at least one wall and an internally facing surface of the at least one wall.

According to an embodiment, at 311, the gap is formed in all size walls or surfaces of the safe.

In an embodiment at 312, the gap is formed in a safe door of the safe.

At 320, the gap is manufactured with an embedded safe protection mechanism that is activated with the externally facing surface is penetrated with an attack tool to thwart or impede penetration into an interior of the safe.

In an embodiment, at 321, a woven fabric is inserted into the gap as the safe protection mechanism.

In an embodiment, at 322, a thin film is inserted into a center of the gap and two chemicals are inserted on each side of the thin film. The thin film when penetrated mix the two chemicals and form a hard foam that impedes the progress of the attack tool. The thin film and the two chemicals combine to form the safe protection mechanism.

In an embodiment, at 323, a chemical mixture under pressure is inserted within the gap and when the externally facing surface is penetrated, the pressure is eased and air interacts with the chemical mixture inducing a hard foam that impedes progress of the attack tool. The chemical mixture under pressure within the gap is the safe protection mechanism.

Figure 4:
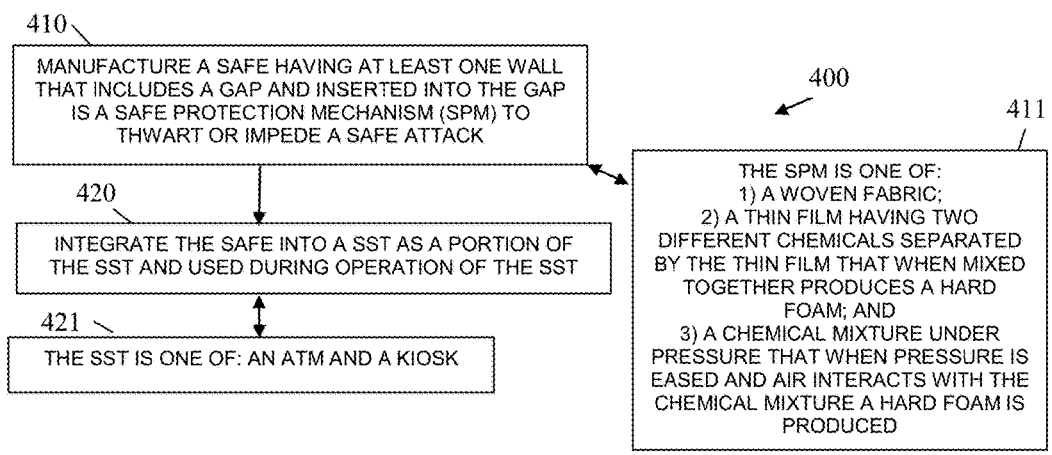
FIG. 4 is a diagram of another method for protecting a safe, according to an example embodiment.

FIG. 4 is a diagram of another method 400 for safe protection, according to an example embodiment.

The method 400 is a combined method of manufacture and installation of the safe 100 of the FIGS. 1A and 1B and the safe 200 of the FIG. 2.

In an embodiment, the method 400 includes all of or some combination of the method 300.

At 410, a safe is manufactured with at least one wall of six walls or surfaces to include a gap and a safe protection mechanism is inserted into the gap to thwart or impeded progress of a safe attack.

In an embodiment, at 411, the safe protection mechanism is one of: a woven fabric, a thin film having two different chemicals separated by the thin film that when mixed together produce a hard foam, and a chemical mixture under pressure that when pressure is eased and air interact with the chemical mixture a hard foam is produced.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A safe, comprising:
   walls; and
   at least one of the walls including a gap and the gap including a safe protection mechanism, wherein the safe protection mechanism including a fabric woven in weaves as one of: a wart and weft fabric, a weft knitted fabric, and a warp knitted fabric, wherein a size of the gap between a first wall and a second wall is approximately 10 mm.

2. The safe of claim 1, wherein the walls are constructed of hard plastic.

3. The safe of claim 1, wherein the at least one wall includes an externally facing surface constructed of a solid material and an internally facing surface constructed of the solid material, the externally facing surface separated from the internally facing surface by the gap and the safe protection mechanism.

4. The safe of claim 3, wherein the at least one wall includes all of the walls.

5. The safe of claim 3, wherein the at least one wall includes a safe door for the safe.

6. The safe of claim 3, wherein the safe protection mechanism further includes a thin film that separates two chemicals, and the thin film when penetrated causes the two chemicals to mix together as a mixture, and the mixture configured to form a hard foam around a site that the film was penetrated.

7. The safe of claim 3, wherein the safe protection mechanism further includes a chemical mixture under pressure, and when the externally facing surface is penetrated pressure is eased and air penetrates the chemical mixture forming a hard foam around a site that the externally facing surface was penetrated.

8. The safe of claim 3, wherein the externally facing surface is constructed of a first solid material and the internally facing surface is construed of a second solid material that is different from the first solid material.

9. The safe of claim 3, wherein the externally facing surface and the internally facing surface are construed a same solid material.

10. The safe of claim 3, wherein the gap includes a first portion abutting the externally facing surface filled with concrete, and the gap includes a second portion abutting the internally facing surface filled with concrete.

11. A method, comprising:
    forming at least one wall of a safe with a gap; and
    manufacturing within the gap a safe protection mechanism that is activated when an externally facing surface of the at least one wall is penetrated with an attack tool to thwart or impeded penetration into an interior of the safe, wherein manufacturing further includes manufacturing the gap with a size of approximately 10 mm, wherein manufacturing further includes providing a least a portion of the safe protection mechanism as a woven fabric having weaves that includes one of: a wart and weft woven fabric, a weft knitted fabric, and a warp knitted fabric.

12. The method of claim 11, wherein forming further includes forming the gap in all walls of the safe.

13. The method of claim 11, wherein forming further includes forming the gap in a safe door of the safe.

14. The method of claim 11, wherein manufacturing further includes inserting a thin film in a center of the gap and inserting two chemicals on each side of the thin film, and when the thin film is penetrated mixing the two chemicals forming a hard foam that impedes progress of the attack tool, wherein the thin film and the two chemicals combine form another portion of the safe protection mechanism.

15. The method of claim 11, wherein manufacturing further includes inserting a chemical mixture under pressure within the gap, and when the externally facing surface is penetrated causing pressure to ease and air to interact with the chemical mixture a hard foam is induced that impedes progress of the attack tool, wherein the chemical mixture under pressure is another portion of the safe protection mechanism.

16. A method, comprising:
    manufacturing a safe having at least one wall that includes a gap and inserted into the gap a safe protection mechanism to thwart or impeded a safe attack, wherein at least a portion of the safe protection mechanism includes a fabric woven into weaves includes as one of: a wart and weft woven fabric, a weft knitted fabric, and a warp knitted fabric, and wherein manufacturing further includes manufacturing the gap with a size of approximately 10 mm; and
    integrating the safe into a Self-Service Terminal (SST) as a portion of the SST and used during operation of the SST.

17. The method of claim 16, wherein the SST is one of: an Automated Teller Machine (ATM) and a kiosk.

18. The method of claim 16, wherein the safe protection mechanism is one of:
    woven fabric;

a thin film having two different chemicals separated by the thin film that when mixed together produce a hard foam; and a chemical mixture under pressure that when pressure is eased and air interacts with the chemical mixture a hard foam is produced.

\* \* \* \* \*